DATA CONVERSION SYSTEM

Filed May 25, 1964 4 Sheets-Sheet 1

INVENTOR
JOHN M. HUNT
BY Frederick L. [signature]
ATTORNEY

DATA CONVERSION SYSTEM

Filed May 25, 1964

4 Sheets-Sheet 2

INVENTOR.
JOHN M. HUNT

BY

ATTORNEY

DATA CONVERSION SYSTEM

Filed May 25, 1964

INVENTOR
JOHN M. HUNT

BY [signature]

ATTORNEY

Sept. 23, 1969 J. M. HUNT 3,469,253

DATA CONVERSION SYSTEM

Filed May 25, 1964 4 Sheets-Sheet 4

INVENTOR.
JOHN M. HUNT

BY [signature]

ATTORNEY

United States Patent Office 3,469,253

Patented Sept. 23, 1969

3,469,253

DATA CONVERSION SYSTEM

John M. Hunt, Binghamton, N.Y., assignor to Singer-General Precision, Inc., Binghamton, N.Y., a corporation of Delaware Filed May 25, 1964, Ser. No. 369,819
Int. Cl. H04l 3/00
U.S. Cl. 340—347 20 Claims

ABSTRACT OF THE DISCLOSURE

A digital to analog converter formed of an input circuit and a processing circuit connected in common to a plurality of output channels which is capable of handling a plurality of words simultaneously, with the number of words being equal to the number of output channels. The input circuit includes a serial memory device having a delay time measured in discrete time increments equal to at least the number of words being converted. The processing circuit includes a fine data turn-on counter which accepts the fine data of each word and adds a "one" thereto during each time increment until a maximum count is attained to supply a turn-on signal to the output channels. The processing circuit also includes a course data turn-off subtractor which accepts the course data of each word and subtracts a "one" therefrom and supplies the modified course data back into the serial memory device. When the course data subtractor has decremented the course data to a minimum count, a turn-off signal is generated thereby and supplied to the output channels. A source of clock pulses is employed to synchronize the fine data counter, the course data counter, and switching circuitry which is operative to steer each of the turn-on and turn-off signals to the appropriate output channel.

This invention relates to data conversion systems, and more particularly to an improved digital to analog converter which employs "time weighing" rather than conventional "resistance weighing" in order to convert a digital signal to an analog signal.

In the electronic computer, automatic control, and instrumentation arts, an increasing number of machines and processes are being controlled, and indications obtained, by means of digital computation. Because the ultimate control and indicating devices, such as motor-driven valves, electric meters, and the like, are generally responsive to analog signals, a large number of installations wherein digital computation is employed require digital to analog conversion equipment to convert the computed output digital signals to corresponding analog signals.

Digital computers are generally resorted to in preference to analog computers when it is desired to attain a very high degree of computational accuracy, and, in order that the inherent accuracy of digital computation be available in the final analog output signal, it is obvious that the digital to analog converter employed also exhibit a comparable high degree of accuracy. Further, since many machines and processes, and in particular "on-stream" controllers and "real-time simulators," require calculation of a relatively rapidly changing variable, it is usually necessary that the digital-to-analog converter be fast as well as accurate. Additionally, as is well known in the design of any electronic equipment, the digital-to-analog converter should be reliable and economical both to construct and to maintain.

According to the prior art, digital to analog converters, in general, operate by connecting precisely controlled reference voltages representing a digital 1 or a digital 0 to a matrix of summing resistors, with a different resistor selected for each bit of the digital word. Further, each resistor has a different value which is weighed in accordance with the significance of its associated bit position. As is well known, such prior art digital to analog converters become extremely diffcult and expensive to design when it is desired to convert digital numbers having approximately ten significant bits, or more, since the tolerance requirements of the individual resistors become extreme.

Additionally, in most digital computer control applications, it is generally necessary that a plurality of digital words be converted to their respective analog signals, and, in order to effect a saving in overall equipment, the digital-to-analog converter is operated in a multiplexed fashion, that is, a single digital-to-analog converter successively converts each individual digital word to its corresponding analog signal. For the reason that no single digital word is being continuously converted, it is necessary in such prior art multiplexed systems, to employ analog "sample and hold" circuits, which are frequently unreliable, inaccurate, and expensive.

There is described in copending application Ser. No. 260,218, filed Feb. 21, 1963, on behalf of John M. Hunt and assigned to the assignee of the present invention, now Patent No. 3,254,337, entitled Data Conversion System, a digital-to-analog converter which employs the principle of time weighing. As there disclosed, the concept of time weighing differs from resistance weighing in that, rather than scaling precision resistors in accordance with the significance of its associated digital bit, a precision reference voltage, corresponding to the value of a particular bit, is coupled through a low-pass filter to the analog output terminal, for a time interval corresponding to the significance of the particular bit. By way of example, the least significant bit, LSB, is coupled to the output terminal for one time unit, the LSB+1 bit for two time units, the LSB+2 bit for four time units, the LSB+3 bit for eight time units, etc. In this manner no extreme precision resistors are required, regardless of the number of significant bits in the digital word being converted. Further, since each analog output channel requires, essentially merely a flip-flop, a transistor switch, and a low-pass filter, it becomes economically feasible to employ individual digital-to-analog converters in each analog output channel when a number of digital words are to be converted, thereby completely eliminating the analog "sample and hold" circuits and other difficulties inherent in any multiplex system.

In a preferred embodiment of that copending application, a plurality of digital words are read out of an output register of a digital computer, or the like, and loaded serially by word into a buffer memory device. Next, the memory device is interrogated to convert all of the digital words simultaneously, serially by bit, commencing with the least significant bit of all words and terminating with the most significant bit of all words.

An improved version of a time-weighing digital to analog converter is described in copending Ser. No. 321,555, filed Nov. 5, 1963, on behalf of John M. Hunt and assigned to the assignee of the present invention, now Patent No. 3,317,905, entitled Data Conversion System. According to this later application, there is provided improved circuitry to eliminate the problem known as "foldover." "Foldover" is the problem which arises when one converts a second digital number which differs from its immediately preceding number by a large number of "carries," resulting in a relatively large transient pulse appearing in the analog output from the filter. An example of a sequence of folded-over binary numbers may be understood from the successive conversions of binary numbers such as 011111111111 and 100000000000. Although each of these numbers, during a conversion operation, provides essentially a square wave to the input of the filter, the second square wave is shifted in phase with respect to the first by approximately 180°. The application to the filter of one square wave during the first conversion cycle followed immediately by the 180° phase shifted wave during the second conversion cycle results in an erroneous transient pulse appearing in the filter output. As disclosed in the latter copending application, these transient pulses are eliminated therein by dividing the time interval required by one or more of the most significant bits into first and second portions, and thereafter applying the first portion to the filter prior to the application of the lesser significant bits and, finally, after the conversion of all of the lesser significant bits, applying the second portion of the time interval required by the one or more of the most significant bits to the filter. Additionally, the conversion system described in Ser. No. 321,-555 provides an increased resolution capability of the digital-to-analog converter over that normally available from the buffer memory device. In both of the above mentioned prior applications, the times during which a reference level voltage has been applied to an output filter channel has been governed by the "0" or "1" value of each given bit, with a given time being assigned to each bit in accordance with the significance of the bit. If, for example, a word such as 0101 (consisting of alternate "1" and "0" bits) is converted, a reference level voltage is applied to the filtering circuit for 1 unit of time, then disconnected for two units of time, then connected for four units of time, then disconnected for eight units of time, with the conversion of each digital word involving the successive connections and disconnection of the reference voltage for successive time periods precisely proportional to bit significance of the successive bits.

According to the present invention, however, there is provided a simpler digital-to-analog converter which, while still employing the same basic principle of time weighing, as disclosed in both the above-reference copending applications, requires only that each analog output channel be turned on and turned off *once* during the conversion of each digital word. This results in a single asymmetrical waveform being applied to the input of the filtering circuit, wherein the asymmetry of the applied waveform is the measure of the desired analog value, and corresponds, in effect, to pulse width modulation. Again, the filter is effective to provide the proper analog voltage at its output terminals. However, since only one turn-on and turn-off per channel per conversion operation is required, the number of turn-ons and turn-offs is, in general, greatly reduced, and, as will be understood as the description proceeds, this feature permits a large reduction in redundancy. That is, by properly staggering the turn-on and turn-off times per channel, it is possible to time-share some or all of the switching equipment and to employ this equipment to operate a number of channels, thereby realizing a significant saving in the number of components required in a large scale digital-to-analog converter. Additionally, a serial memory is advantageously employed with this time-sharing system rather than the conventional spatial, or core plane, memory.

Briefly, the positive output voltage from a transistor switch is coupled to an output filter during only a *single* time interval during each conversion cycle. This time interval is initiated in accordance with the magnitude of the least significant bits. Considering now, a simplified example involving a 4-bit word, 4 channel digital-to-analog converter, during the conversion of each 4-bit digital word, the two lesser significant bits determine the start of the output pulse applied to the filter and the two most significant bits determine the end of the pulse, with the most significant bits having a much greater effect on the duration of the pulse. Generally, during a conversion operation a reference potential, such as a precision negative voltage, is applied to the filter input during the off time interval. During the one time interval, however, a precision positive voltage is applied to the filter input. The ratio of the on to off times, therefore, is effective, after filtering, to provide an analog voltage representative of a digital number, the analog output voltage being commensurate with the value of the digital number being converted in accordance with the number of significant bits included therein.

Basically, a turn-off pulse for each word being converted is provided by recirculating the most significant word bits through a number of parallel serial-memory devices, one for each bit, and subtracting one count prior to recirculating the bits. The generation of a borrow signal by the subtractor is employed to remove the applied precision positive voltage from the filter input. Additionally, a turn on pulse is provided by loading the least significant bits into a fine data counter, and thereafter adding one count to the counter during each one of a number of unit time intervals, until a predetermined count is obtained, the predetermined count being operative to apply the precision positive voltage to the filter input. In this manner, the positive potential is applied to the filter only once during each conversion operation.

Further, it should be noted that, and this is an important feature of the invention, although serial memories normally exhibit an effective dead time, that is, the time between the application of a signal to the input terminals and the time at which the signal is available at the output terminals, this dead time is advantageously employed to provide for the conversion of additional digital words without a corresponding increase in the necessary hardware and circuit complexity, all as more particularly hereinafter described.

It is an object of the invention therefore, to provide an improved digital-to-analog converter.

Another object of the invention is to provide a digital-to analog converter employing time weighing conversion in a novel manner which includes time-sharing of some or all of the components between a number of output channels.

A further object of the invention is to provide a simplified time weighing digital-to-analog converter.

Still another object of the invention is to provide an improved time weighing digital-to-analog converter wherein each channel turns on and turns off only once during a full conversion cycle of a given digital word.

Yet another object of the invention is to provide a time weighing digital-to-analog converter wherein circuit redundancy is reduced by properly staggering the switching times of a number of channels in order to time-share some or all of the switching components operable to turn on and turn off a number of analog output channels.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1*a* is a timing diagram illustrating the application of the precision reference voltages to an output filter in accordance with the prior art.

FIG. 1*b* is a timing diagram illustrating the application of the precision reference voltages to an output filter in accordance with a preferred embodiment of the invention.

FIG. 1*c* is a timing diagram illustrating the application of precision reference voltages to individual output filters in accordance with a multi-channel embodiment of the invention.

Figure 1A:
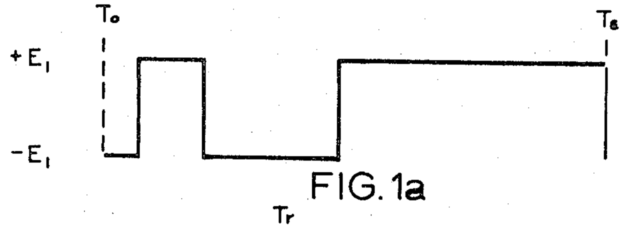

Before commencing with the detailed description of the operation of the data conversion system of the invention, several of the underlying basic concepts of the invention are first emphasized, employing an elementary four bit-four word converter as a specific example, and the extension of the principles to a large scale apparatus, such as a 12 bit-64 word system, will then be hereinafter partly described and partly obvious. The basic organization of the data converter system of the invention includes a number of serial-memory devices, each of which may be a conventional delay line, which devices, when combined in a serial memory unit are capable of storing four, four-bit words; processing circuitry for determining conversion turn-on and turn-off times, the processing circuitry being time-shared among the four channels and arranged to "consider" each channel during a selected time interval; four output circuits, one for each analog channel, so that the four analog voltages are available simultaneously; an input register for accepting the digital words from a computer or other source; and a plurality of entry gate circuits for properly applying the digital words to the serial memory. During a conversion operation, the processing circuits accept digital words from the computer, operate on them to determine the exact times for applying and removing a precision reference voltage to an analog output filter and then addresses the proper output channel, and turns it on or turns it off as the case may be. All of the processes involved, i.e., the extraction of words from memory, processing, addressing each individual channel, and turn-on and turn-off of each individual channel, are interleaved in time in such a manner as to time-share the processing circuitry, and to make use of the digital words at the only time they are available, that is, when they appear at the end of the delay lines. In order to accomplish this feature, the output rectangular waves for all of the channels are staggered in time with respect to each other.

In order to properly understand the operation of the data conversion system of this invention, it is first necessary to properly understand a basic concept involved in the handling of the digital word. This fundamental idea is that each digital word can be divided into two halves or two groups of bits, that is, the most significant bits and the least significant bits. Each of these groups can thereafter be considered as an independent number, except that the bits of the most significant half, hereinafter labeled the "coarse" data, are more heavily weighed than the bits of the least significant half, the "fine" data. Next, a zero time reference is assumed for the asymmetrical waveform to be generated. This is an imaginary point in time, such that turn-on occurs prior to the zero time reference and turn-off occurs after it. Turn-on, which is controlled by the fine data, occurs, for a four bit word, up to four microseconds ahead of the zero time reference, that is, 1, 2, 3, or 4 time units before the zero time reference, when a microsecond is selected as a basic time unit, or clock pulse period, depending upon the value of the fine data number. Turn-off is controlled by the coarse data, but in this case the time unit is not one microsecond but rather four microseconds. Therefore, turn-off time may occur at approximately zero reference time, four microseconds after zero reference time, eight microseconds after zero reference time, or 12 microseconds after zero reference time, depending on the value of the coarse data number.

The processing circuitry included in the four digital bit converter of the invention causes the fine data turn-on circuitry to measure out anywhere from one to four microseconds, in one microsecond increments, backwards from the assumed zero time reference, and the coarse data turn-off circuitry to measure out anywhere from zero to 12 microseconds, in 4 microsecond intervals, forward from zero time reference.

Referring now to the drawings, FIG. 1*a* illustrates the application of a precision reference voltage to an analog output low-pass filter according to the hereinabove referenced prior copending applications. As shown in FIG. 1*a*, the precision reference voltage is applied first, for two time intervals and later for eight time intervals, during the conversion of the digital number 1010 by way of example. In the example demonstrated, the reference voltage is applied during time intervals commensurate with the value of significance of each particular digital bit commencing with the LSB, with each bit considered individually and in succession. Thus, during a unit time interval, which may be one microsecond, the precision positive reference voltage is not applied to the filter input terminals in accordance with the 0 value assigned to the LSB. Next, the reference voltage is applied for two time intervals in accordance with the digital 1 value assigned to the LSB+1 bit. Continuing, the reference voltage is removed from the filter during the next four time intervals corresponding to the digital value of 0 assigned to the LSB+2 bit. Finally, the reference voltage is again applied to the filter for eight unit time intervals in accordance with the digital value of 1 of the MSB. It should be understood, therefore, that, according to the prior art, the precision reference voltage is either applied to, or removed from, the filter a number of times during a conversion operation commencing with time $T_0$ and ending at time $T_e$, and the number of switching times increases greatly as the number of significant bits of the digital word being converted increases, depending, of course, on the specific value of each significant bit.

Figure 1B:
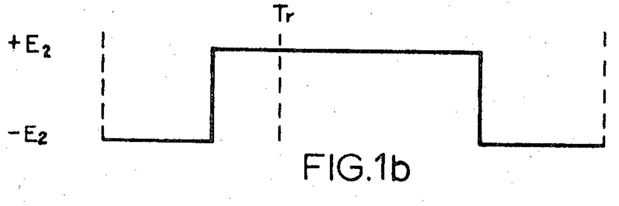
Figure 1C:
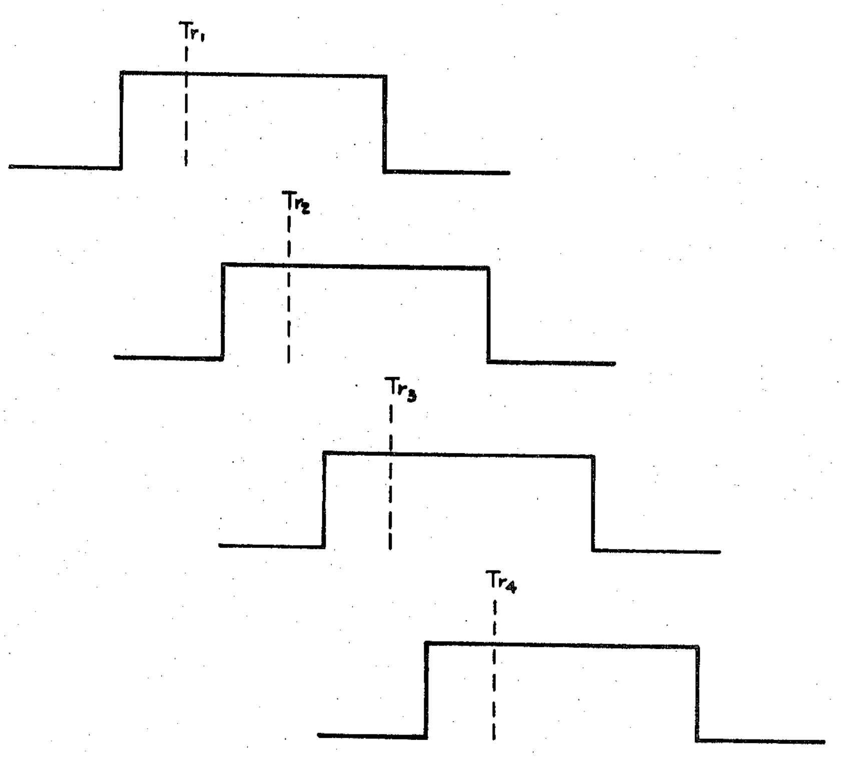

However, as shown in FIG. 1*b*, the present invention applies the reference voltage to the filter only once during the conversion of the digital number 1010, and further, operates only once to remove the voltage from the filter, *independently of both the number of significant bits being converted and the value of such bits.* This latter feature is of extreme importance since, not only may the design of the analog output filter be simplified, but the single switching operation permits time-sharing of a majority of the circuit elements employed, thereby providing for the conversion of additional digital numbers without an extra increase in either circuit complexity or design. As further shown in FIG. 1*b*, the generated asymmetrical waveform is developed about an arbitrary zero time reference $T_r$, the turn-on time preceding time $T_r$ being determined by the value of the least significant bits in combination, and the turn-off time following $T_r$ being determined by the value of the most significant bits in combination. Provided only that different time displaced, zero-time references be assigned to each individual digital word, simultaneous conversion of a number of words is performed in parallel. This feature is illustrated in FIG. 1*c* wherein four zero time refernces, $T_{r1}$ through $T_{r4}$ are assigned to separate conversion channels, each channel being operative to convert a respective digital number into a corresponding analog voltage. Note should be made of the fact that, as shown in FIG. 1*c*, although each of the waveforms are shifted slightly one to another, each of the waveforms are simultaneously generated, all without employing additional circuitry.

To allow simultaneous conversion of plural digital numbers but still avoid the duplication of apparatus which ordinarily attends parallel operation, the present invention utilizes switching control apparatus which is common to a plurality of conversion channels, but the switching times of the individual channels are arranged in an interleaved manner, with the basic conversion cycles of the individual channels staggered in time, so that a single switching control apparatus may be used to control all of the conversion channels.

In FIG. 1c it will be seen that four "turn-on" times, i.e., the leading edges of the four waveforms, all occur at different times, If, as assumed, the fine data portion of each digital word comprises two bits (a possibility of *four* different values), four time periods during which a given channel can be turned on must be provided for each word to be converted, and thus it will be seen that at least 16 time periods must be provided in an overall conversion cycle during which all four words are converted. In the simplified embodiment to be described sixteen such periods are indeed provided, together with four additional time periods which are necessary in order to provide the proper staggering of the individual time references, and thus an overall conversion cycle in which all four words are converted comprises a total of 20 successive time periods, which may be timed by 20 successive clock pulses from a conventional clock pulse source.

If, as assumed, the coarse data portion of each digital word also comprises two bits (a possibilty of four different values), it will be seen that four time periods during which a given channel can be turned off must be provided for each word to be converted. However, since turn-off in one channel can take place at the same time that turn-on is occurring in another channel, no additional time periods beyond the twenty mentioned above need be provided in an overall conversion cycle in which all four words are converted.

Figure 2:
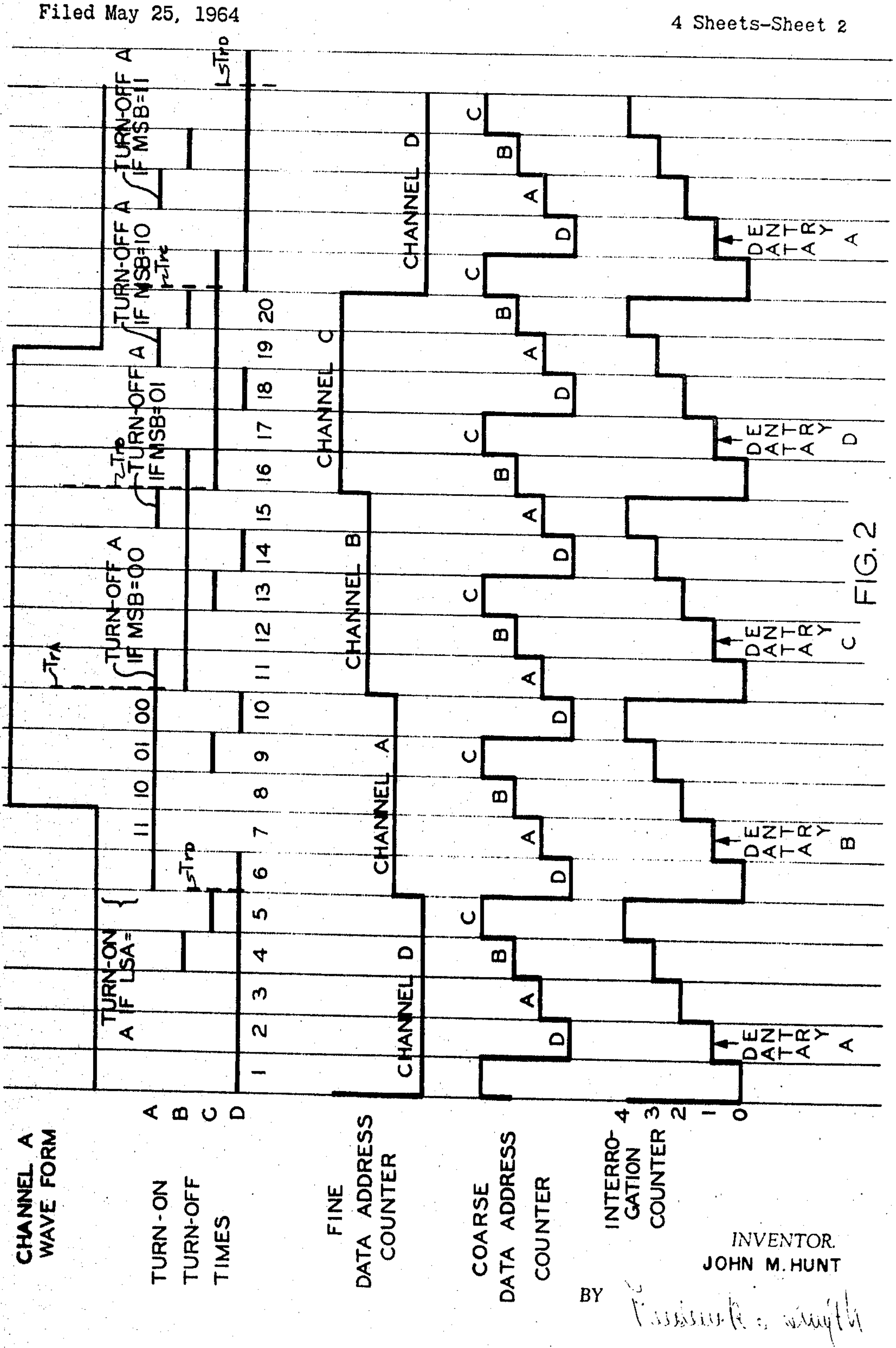
FIG. 2 is a timing diagram illustrating the sequence of events occurring during a multiword conversion operation by the data conversion system of the invention.

The 20 clock periods of an overall conversion cycle in which all four words are converted are divided into four quarters. At various times during the first quarter (clock periods 1–5) channel D may be turned on, with the exact time which channel D is turned on during the 1st quarter depending upon the value of the two fine data bits to be converted in the D channel. Similarly, the second, third and fourth quarters, clock periods 6–10, 11–15, and 16–20, respectively, are allocated for control of the turn-on times for channels A, B, and C, respectively, it being remembered that the initial clock period of each quarter provides the correct time staggering between the channels. The larger the value of the fine data which is to be converted in a given channel, the earlier will be the "turn on" time of the channel during the quarter-cycle allocated for turn-on of that channel. For example, if the fine data bits being converted in channel D are 01, channel D will be turned on at the beginning of clock period 4, while if such bits are 10 or 11, the channel will be turned on at the beginning of clock period 3 or 2, respectively, and if the value of the fine data bits are 00, the channel will be turned on at the beginning of clock period 5 immediately prior to the zero time reference for channel D. Each of the other three channels are arranged to operate similarly, with the exact times during their respective quarter-cycle that they are "turned on" depending upon the values of the fine data portions of the words being converted in the respective channels. Referring now to FIG. 2, it will be seen that the sample waveform for channel A begins at the beginning of clock period No. 8, which is *two* clock periods after the beginning of the channel A turn-on quarter-cycle, and hence the sample channel A waveform in FIG. 2 assumes that the fine data being converted in channel A is binary 10 (decimal 2).

Briefly stated, turn-on time for each channel is determined by "dumping" the least significant bit or fine data, into a counter, and thereafter increasing the stored count by one during each unit time interval. Turn-on time is specified by determining how long it takes to fill up, or "run out" the counter after the fine data has been registered in the counter. If the fine data initially dumped in the counter is a small number, it will be seen that it will take more unit time intervals to fill up the counter than if the data initially put into the counter were a large number, and hence that turn-on, which occurs when the counter is full, will take place later in time for fine data having a small value than for fine data having a large value. A turn-on signal is generated when the counter runs out, that is, the count changes from 10 to 11. The counter is selected so that a count of 00 corresponds to the assumed zero time reference (note $T_r$ in FIG. 1*b*), and therefore a count in the counter of 1, 2, or 3 effectively provides a "time previous to zero" reference for a given channel. By way of example, a count of 10 in the fine data counter will cause the counter to reach a count of 11, three microseconds before zero reference time, and this count provides an output signal to turn the particular channel on. The count-up process actually takes five microseconds rather than four microseconds during the conversion of a four bit word in order to allow staggering the zero time references between channels. Therefore, during the first five microseconds, the fine data of channel A is processed, then in the next five microseconds, the fine data of channel B is processed, and so on, until all four channels have been processed. The program then again commences by processing the fine data of channel A. However, since the fine data period must immediately proceed each channel's zero time reference, the zero time reference of all channels are not the same but are displaced by five microseconds. This permits the fine data processing circuitry to be time-shared and results in the staggering of the output waveforms as shown in FIG. 1*c*. It should also be noted that this specific time-sharing is for the turn-on, or fine data, circuits only. The turn-off, or coarse data, circuits operate independently and in parallel, and this circuitry is also time-shared among the four channels, except that the time-sharing is performed somewhat differently.

The turn-off time, determined by the value of the MSB's, or coarse data, is accomplished by making use of the fact that the rectangular waveform for each channel is staggered by five microseconds from the preceding channel in the particular example now being described. Because of this, the possible times at which turn-off can occur, that is in four microsecond increments for a given channel, are also staggered by five microseconds from one channel to the next. It should be noted that this staggering of five microseconds consists of the basic delay period of four microseconds imparted by the serial memory, plus one extra microsecond. Thus, if turn-off opportunity for channel A should occur in a given microsecond, then a turn-off opportunity for channel B will occur in the very next microsecond, an opportunity for channel C in the next microsecond, and so on. For this reason, it is possible to time-share the turn-off circuitry, since the turn-off opportunities for the various channels are separated in time. It should also be noted that while each channel is connected so as to be capable of being turned off once every four microseconds, it will, of course, actually turn-off only at the time specified by the value of its coarse data.

The manner in which the coarse data is operated upon to determine when a given channel should turn off is accomplished in the following manner. At the time the coarse data is inserted into the serial memory, it is a 2-bit binary number representing the number of four microsecond increments of time after zero time reference at which the particular channel should turn off. In the particular example now being described, it requires just four microseconds for this binary number to travel through the serial memory, and this delay time is employed to mark the passing of the four microsecond periods. As the number emerges from the memory, it is applied to a subtractor unit where its magnitude is reduced by one, and the generation of a borrow" signal, if such a signal should result from this operation, is effective to initiate the turn off procedure. Next, the binary number delivered by the subtractor unit is again reinserted into the serial memory unit. Again, it should be noted that, by being reduced in amount by one unit in each trip through the memory, the coarse data number decreases by one every four microseconds, and will be identically equal to zero, in exactly 4N microseconds, wherein N was the original value of the number. Thus the circuitry of the data conversion system of this invention is arranged to turn-off a channel when the subtractor unit generates a borrow signal, and, therefore, turn-off occurs exactly 4N microsecond periods after the assumed zero reference time, in accordance with the logic rules summarized above. There are five of the basic 4-microsecond periods during each conversion cycle of 20 microseconds, and by allowing the coarse data number to continue to recirculate through the serial memory, being decremented exactly four times per overall conversion cycle, turn-off will occur at the same time in the cycle per given coarse data number. To accomplish this feature, the decrementing is inhibited during the first recirculation of the coarse data through the memory, and, by also recirculating the fine data, indefinite operation is possible, with the updating of the coarse and fine data being required only when it is necessary to change their values. Thus turn-off time is determined by recirculating the coarse data through a delay line, subtracting one from the coarse data each time (after the first time) that it emerges from the delay line, and sensing when the coarse data changes from 00 to 11. If the coarse data is a large number, it will be seen that more passes of the data through the delay line will be required than if the coarse data is a small number, and hence that a longer time will pass before the coarse data is decremented to 11 to provide a turn-off signal.

Referring again now to FIG. 2, there is illustrated several of the waveforms employed to generate the output asymmetrical waveform for each channel, with only the channel A waveform corresponding to the digital number 1010 being presented, the remaining waveforms being similar to those illustrated in FIG. 1C. Note that the 20 clock pulse periods are divided into four quarters as determined by an interrogation counter cyclically progressing from a count of 0 to 4. During each of these quarters one channel is caused to turn-on in accordance with the value of its fine data. Thus, channel D is turned on during clock pulse periods 1 through 5, channel A is turned on during clock pulse periods 6 through 10, channel B is turned on during clock pulse periods 11 through 15, and, finally channel C is turned on during clock pulse periods 16 through 20. However, as hereinbefore stated, the first clock pulse period of each of these quarters is necessary to obtain the proper time staggering of the zero time references from one channel to the next, in order to allow time sharing of the process circuitry, and no channel is turned on during this period. As indicated in FIG. 2, channel A turns on during the second quarter at the beginning of clock pulse periods 7, 8, 9, or 10, under control of the fine data values of 11, 10, 01, and 00, respectively. Turn-on channels B, C, and D occurs in similar fashion. It thus can be seen that the larger the value of the fine data subnumber, the earlier in time the asymmetrical waveform is generated, in accordance with the logic rules enumerated above.

The resetting of the interrogation counter to zero, defines the separation between quarters, and this separation corresponds exactly to the zero time reference for the channel turned on during the immediately preceding quarter. By way of example, the interrogation counter resets to zero at the beginning of clock pulse period 6, and this resetting step initiates the start of the second quarter. Additionally, this resetting operation defines the zero time reference for channel D, $T_{rD}$, the channel turned on during the first quarter. Note that the interrogation counter advances a fine data address counter, and it is this latter counter which is effective to couple the turn-on signal to the proper channel, as will be better understood as the description proceeds.

The termination of the asymmetrical waveform is controlled in a somewhat different manner, since four clock pulse periods are assigned to each possible value of the coarse data. For this reason, a coarse data address counter is provided, which cyclically steps between 0 and 3, and is effective to couple the turn-off signal, when generated, to the proper channel at four microsecond intervals. As also shown in FIG. 2, channel A may be turned off during clock pulse periods 11, immediately after the zero time reference for channel A, 15, 19, and 23 (or 3), under control of the coarse data values of 00, 01, 10, and 11. It might be assumed that a waveform extending until clock pulse period 23 is inconsistent with the four, five microsecond quarters listed above, and a conversion operation may require longer than 20 microseconds. However, this results only from the fact that the asymmetrical waveform is delayed with respect to the previously defined quarters, which fact will become readily apparent when it is noted that data to be converted in each channel is entered at 20 microsecond intervals, as indicated by the data entry arrows adjacent the interrogation counter waveform.

Further, since each channel can be turned off only at four microsecond intervals, the coarse address counter is employed to couple the output channels to their respective turn-off signals, if generated, in sequence. However, in order to insure that each channel is turned on prior to being turned off, the generation of a turn-off signal is inhibited each quarter for the channel being turned on. Thus, during clock pulse period 6, channel D is turned off if the value of its coarse data is 00, while during clock pulse period 7 channel A cannot be turned off independent of the value of its coarse data, since, during the quarter defined by clock pulse periods 6 through 10, channel A is being turned on. Continuing, during clock pulse period 8, channel B is turned off if the value of its coarse data is 11. Thus, channel B is turned off during or prior to the second quarter to allow it to again be turned on during the third quarter. Finally, channel C is turned off during clock pulse period 9 if its coarse data has the value 10, and channel D is turned off during period 10 if its coarse data is 01. Similar turn off times are available throughout the remaining quarters. It thus can also be seen that the larger the value of the coarse data subnumber, the later in time the asymmetrical waveform is terminated, again in accordance with the logic rules enumerated above.

As indicated above, each channel may be turned off only once every four microseconds, and therefore at least the coarse data must be stored for periodic time intervals determined by the time intervals between adjacent possible turn off times. For reasons which will become apparent as the description proceeds, it is preferred that this storage be accomplished by a serial memory unit, which may comprise a number of delay lines or a number of shift registers through which data is advanced by the same source of clock pulses which operate the interrogation counter, the storage time of the serial memory unit being equal to the periodic time intervals. Further note should be made of the fact that, while it has been stated that the asymmetrical waveform is turned on at the beginning of a clock pulse period, turn-off occurs *during* a clock pulse period. This results from the fact that storage of both the fine data and coarse data is performed serially during a clock pulse period, so that the coarse data is not available until some time after the beginning of a clock pulse period. By way of example, if the data is represented by the presence or absence of one half microsecond pulses, then turn off will occur one half microsecond after the beginning of a clock pulse period.

Figure 3:
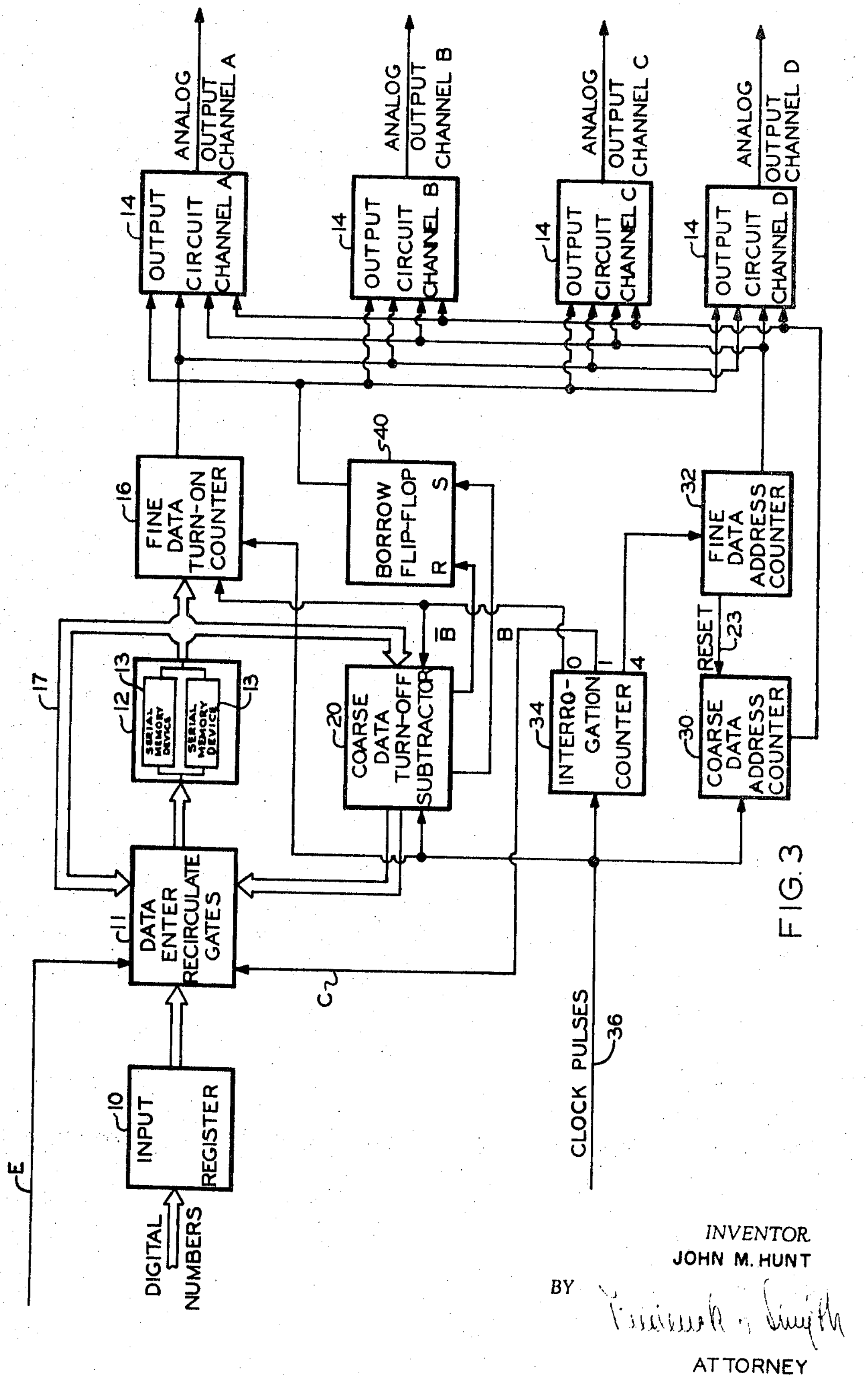
FIG. 3 is a block diagram of a preferred embodiment of the data conversion system of the invention.

Before continuing with a more detailed description of the generated asymmetrical waveforms, a description of a preferred embodiment of the circuitry employed next follows, it being remembered that each channel being converted is assigned an arbitrary zero time reference, and the fine data is employed to apply the reference voltage to the filter at a particular time preceding zero reference time, while the coarse data is employed to remove the reference voltage at another particular time subsequent to zero reference time. Referring again to the drawings, FIG. 3 illustrates a simplified block diagram of a first embodiment of the data conversion system of the invention. As there shown, digital numbers from a computer memory, or other storage device, are applied to an input register 10, either serially or parallelly by bit. Register 10 may be a single word buffer device, or alternatively a shift register through which a number of digital numbers are periodically advanced under control of the data source. Read out of a number from register 10 into data enter-recirculate gates 11 is timed in accordance with the energization of a line C from a interrogation counter 34, the energization of line C commencing a conversion operation. Further, the conversion of either recirculated data or new data is controlled by an entry line E. In either case, the number from gates 11 is applied to a serial memory unit 12 which includes a number of serial memory devices 13 connected in parallel.

As indicated above, each of the digital numbers can be considered as consisting of a pair of digital subnumbers, one of which is formed by the least significant group of bits and the other of which is formed by the most significant group of bits. Since each of these subnumbers are operated on independently, it is feasible to apply both the LSB and the MSB to one serial memory device, the LSB+1 and the MSB−1 to another serial memory device, etc., during a unit time interval. If the digital number being converted has an even number of bits and can therefore be divided into two bit-groups having the same number of bits, the number of serial memory devices required is equal to one half the number of bits in the number being converted, and, as shown in FIG. 3, two serial memory devices 13 are employed in the embodiment now being described. However, if the digital number being converted has an odd number of bits, the number of serial memory devices required is equal to one half the number of bits plus one in the number being converted.

The total delay time provided by serial memory unit 12 is determined by the number of significant bits in the longest word to be converted. The delay is selected equal to the weight (or value) of the lowest bit (least) of the most significant bit group of the digital word to be converted. Where a one microsecond unit time interal is used, a four microsecond delay time is selected when the number of bits per word is four, as the weight of the lowest most significant bit is four. (For four bits, the weight per bit in increasing order is one, two, four and eight.) When a 12 bit word is to be converted, the weight of the lowest bit of the most significant (sixth *most* significant, or seventh *least* significant) bit group is 64, and hence a 64 microsecond delay line is used. For optimum results, the number of words being converted is equal to the delay time of the serial memories. By way of example, as many as four four-bit words may be simultaneously converted by the apparatus of FIG. 3. Therefore, during a conversion clock pulse period, as determined by an interrogation counter 34, the least significant bit group, or fine data is first applied in parallel to serial memory unit 12, and then the most significant bit group, or coarse data is applied. Next, after a predetermined time delay characteristic of unit 12, the fine data and coarse data appear at the output of serial memory unit 12. Generally, while it is preferred that conventional delay lines be employed in unit 12, it will be understood that other and different forms of serial memory devices may be substituted if desired.

In order to determine the proper time to turn on a particular output circuit 14 (of a group of parallel output circuit 14) associated with a given digital word being converted, the fine data is fed to a "fine data" turn-on, or start, counter 16. Also coupled via line 36 to *start* counter 16 is a source of clock pulses operative to increase the count in the counter by one during each subsequent clock pulse period. Counter 16 is provided with a maximum count capacity which corresponds to the maximum possible value of the fine data subnumber. For example, if the fine data subnumber includes two bits, having a maximum possible value of 11, counter 16 is made to be capable of counting up to 11, and when the counter is "run out," i.e., when the maximum count in the counter is reached, a "turn-on" output signal is generated and steered to the proper one of output circuits 14 under control of a fine data address counter 32. Turn-off time is determined by applying the coarse data subnumber to a coarse data turn-off subtractor unit 20, which is effective to provide a turn-off signal upon the occurrence of a borrow signal, generated during one of the successive subtractions of "one" from the coarse data, indicating that the coarse data subnumber has been decremented through zero. This turn-off signal is also steered to the proper one of output circuits 14 under control of a coarse data address counter 30.

Because the successive subtraction of "one" from the most significant bit group will not generate a borrow signal until the coarse data has been decremented enough times to reduce the coarse data through zero, the coarse data output from subtractor 20 is recirculated through the loop including data enter-recirculate gates 11 and serial memory unit 12, and subjected to successive subtraction operations. Such recirculation and subtraction continue until a borrow signal, is in fact, generated.

As noted above, several clock pulse periods may be required after the beginning of a conversion cycle before turn-on is initiated, depending, of course, on the value of the fine data. Therefore, it is necessary to inhibit the subtraction operation on the associated coarse data during the quarter that turn on for the particular channel is being initiated, to insure that a turn-on signal is generated prior to the generation of a turn-off signal. Additionally, as will be understood as the description proceeds, the recirculating coarse data is applied to serial memory unit 12 during a time period other than that which initiates a conversion operation, since a conversion operation comprises four, five microsecond quarters and the coarse data is recirculated once every four microseconds, and, therefore, it is convenient that the fine data also be recirculated therewith by means of a line 17. In this manner, continuous conversion of the same digital number is automatically performed, unless new data is substituted therefor, since after four subtraction operations the coarse data has returned to its original value and, together with the fine data, can be re-entered to commence a new conversion operation.

A major advantage of the data conversion system illustrated in FIG. 3 is that a plurality of digital words may be undergoing conversion simultaneously. Interrogation counter 34 is connected to be cycled through its entire counting cycle by clock pulses applied via line 36, and counter 34 is provided with a count capacity of 4, as shown in FIG. 2. Thus interrogation counter 34 cycles through its counting cycle four times during the turn-on times of all four words. A first digital word is applied to serial memory unit 12 during a first clock pulse period during which the count in counter 34 stands at 1, a second digital word is applied to serial memory unit 12 during the next clock pulse period in which the count in counter 34 stands at 1, etc., provided only that the number of words being converted does not exceed the magnitude of the delay provided by memory unit 12. Under these conditions, the turn-on times for the output circuits are generated in order, that is, the output circuit for channel A is turned on, then the output circuit for channel B is turned on, until the output circuit for channel D is turned on. However, the several output circuits are repetitively looked at in sequence for the proper turn-off time. By way of example, the output circuit for channel A is coupled to borrow flip-flop 40 during clock pulse period 3, then the output circuit for channel B is coupled to unit 40 during clock pulse period 4, and continuing until the output circuit for channel D has been coupled to unit 40 during clock pulse period 6, at which time the cycle repeats with the output circuit for channel A again being coupled to unit 40, the state of flip-flop 40 determining whether or not a particular output circuit is turned off.

As a result of time-sharing various of the components shown in FIG. 3, it is necessary to address the proper channel output circuitry for the generated turn-on and turn-off signals, since these signals are true for only one output channel at a time. The addressing is performed by a pair of counters, the first of which is a coarse channel address counter 30 and the second being a fine channel address counter 32. Since the fine data processing circuitry remains coupled to each of the channels for five microseconds before moving on to another channel, the fine channel address counter is advanced upwards only once every five microseconds. However, because the coarse data processing circuitry remains on each channel for only one microsecond, scanning through all four channels in four microseconds, it is advanced upwards once every microsecond. The outputs from these address counters are then decoded and thereafter employed to enable the selected ones of output circuits 14.

In the embodiment shown in FIG. 3, the serial memory devices indicated within serial memory unit 12 are generally delay lines, each of which exhibits a delay of 4 microseconds with a frequency response of at least 2 megacycles in order to store two pulses in each microsecond of length, yielding a storage capacity of 8 bits. Total storage of the two delay lines then is 16 bits. If each digital word to be converted is 4 bits long, then obviously four such words can be stored in the delay lines, it being understood that other combinations of delay time-frequency response, and storage capacity may be substituted as required. In the example above described, the two least significant bits of a 4-bit digital word are inserted in parallel into the two delay lines, so that they flow down the lines abreast, then one-half microsecond later in time, the most significant bits of the same 4-bit word are inserted. At the end of the delay time, 4 microseconds later, the word emerges, first, the least significant half of the word, 2 bits in parallel, then one half microsecond later, the most significant half of the word, again 2 bits in parallel. This accomplishes storage of 4 microseconds' duration, and longer storage is accomplished by reintroducing the word into the input circuits of the delay lines to obtain another 4 microseconds of storage. Every 4 microseconds the word emerges from the output ends of the delay lines available for use, and in between, of course, it is in transit down the lines unavailable for use. Further, after new data to be converted has been placed into the delay lines and started on its way, data to be recirculated corresponding to a previous word being converted is put in just behind it during the next clock pulse period, and so on, until the delay lines are filled completely. Just after the last word is inserted, the first word emerges from the output of the delay lines. Since the first word comprises new data to be converted, the fine data is dumped at this time into fine data turn-on, or start, counter 16 under control of the 0 output from interrogation counter 34, and also recirculated by line 17 to enter gates 11. During this same clock pulse period, the associated coarse data is directed to subtractor unit 20. However, the 0 output line from counter 34 inhibits decrementation, and the coarse data is recirculated through gates 11 and memory unit 12 unchanged. Note also that the word to be converted is dumped, or loaded, into start counter 16 at the beginning of a conversion quarter, the clock pulses applied thereafter by line 36 being operative to advance the count by one until a count of 11 is reached which generates the turn on signal.

The following three words which emerge from memory are operated upon differently. During these three clock pulse periods the 0 output line is not energized, and thus start counter is not enabled to be loaded with new data. Since the fine data of these three words is blocked from entering counter 16, it is only recirculated back to enter gates 11 along line 17. Further, since the 0 output of interrogation counter 34 is not energized during this three clock pulse periods, the coarse data of each of these words is decremented by one in sequence and tested by borrow flip-flop 40 to determine if a borrow or not borrow signal is generated.

It should now be seen that the fine data of each word can be recirculated with the associated coarse data without affecting a conversion operation since the timing of the overall system is such that a digital number can be converted into an analog voltage only when the number is applied to memory during a predetermined time interval. Note that a count of "one" from interrogation counter is applied to gates 11, and this count is effective as an "enter" signal allowing either new or recirculated data to be converted (see FIG. 2) the data still being operated upon from a previously initiated conversion operation being applied to enter-recirculate gates 11 during time periods other than when interrogation counter 34 is set at one.

The count in interrogation counter 34 is advanced by a series of clock pulses available on a line 36, and the clock pulses are additionally coupled to fine data turn-on counter 16. Thus, the count loaded into counter 16 from serial memory unit 12, together with one or more clock pulses from line 36, operates to advance counter 16 to a total count of three (11), in the present example. This count of three is employed to turn on the proper one of output circuits 14, and this may be accomplished by an AND circuit (not shown) coupled to the "one" output line of each of the stages within counter 16, or by means of other well known logic circuitry.

Additionally, the coarse data from serial memory unit 12 is applied to coarse data turn-off subtractor unit 20, in which a count of one is subtracted therefrom during each clock pulse period. However, to insure that turn-on always occurs before a turn-off signal is generated, the zero count from interrogation counter 34 is applied to subtractor unit 20 as an inhibiting pulse to prevent the subtraction of one from the coarse data during the first recirculating time interval as stated above. During the conversion operation, the subtraction of a "one" from the coarse data will result in the generation of a borrow signal, B, when the coarse data subtractor unit resets from zero to three (00 to 11). This borrow signal is sensed by borrow flip-flop 40, which is effective to turn-off the proper one of output circuits 14. Additionally, if no borrow, signal $\overline{B}$, is generated during the subtraction operation, this signal is employed to reset flip-flop 40, if the flip-flop had previously been set.

In order to select the proper one of the output circuits 14 for turn-on and turn-off, a pair of counters 30 and 32 are employed. As hereinbefore stated, each of the output circuits 14 are turned on consecutively, but the turn-off signal is repetitively sensed. As shown in FIG. 2, fine data address counter 32 is advanced by interrogation counter 34, but only when counter 34 reaches a count of four. Thus, the fine data address counter 32 is advanced only after interrogation counter has achieved its maximum count, thereby insuring that the particular channel being serviced will be turned on. Coarse data address counter 30, however, is advanced solely by the clock pulses by line 36, in order that each output circuit will be coupled to subtractor unit 20 during each time interval that the corresponding coarse data is available from serial memory unit 12. Finally, a count of zero from fine data address counter 32 is employed to reset coarse data address counter 30 to 3, (11), in order to synchronize interrogation counter 34 and the fine and coarse data address counters.

Figure 4:
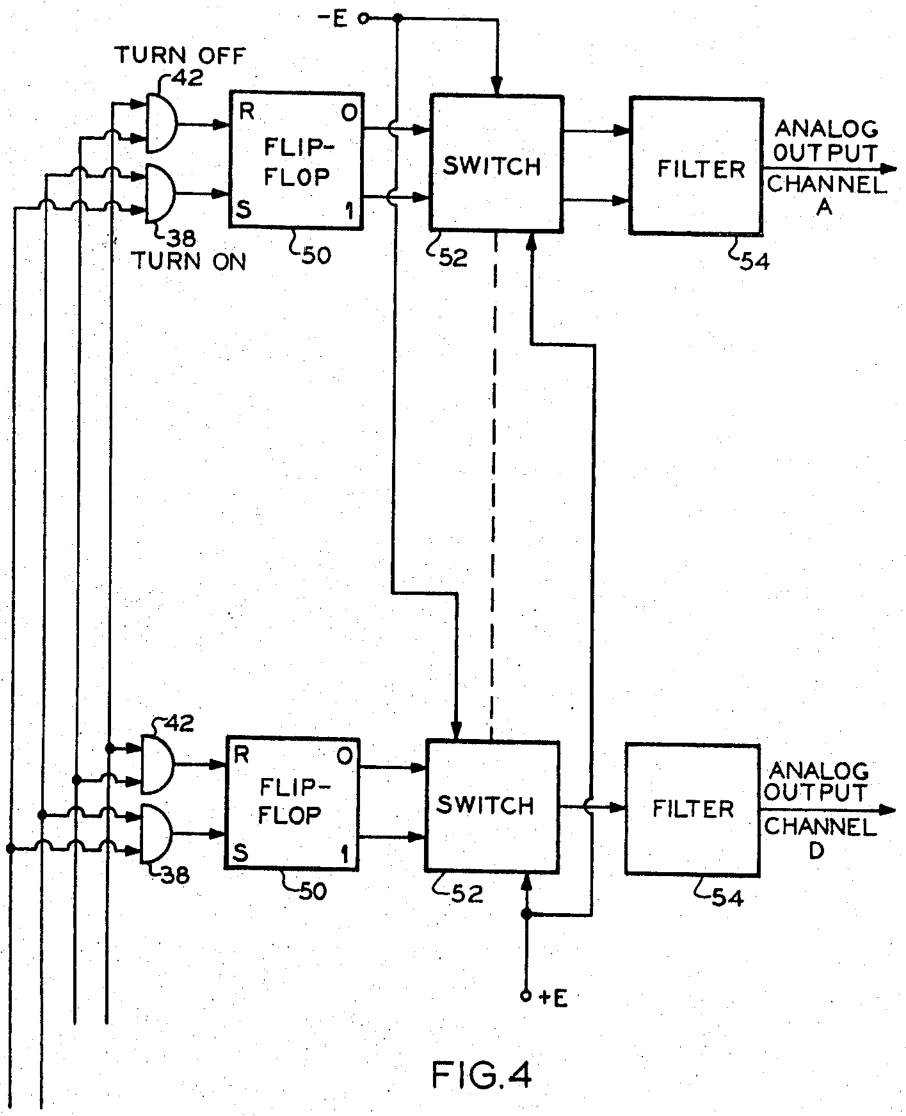
FIG. 4 is a block diagram of the output circuits illustrated in FIG. 3.

FIG. 4 is a simplified block diagram of two of the four output circuits 14 illustrated in FIG. 3. Each output circuit 14 includes a flip-flop 50, a transistor switch 52, and a low-pass filter 54, as well as a turn-on gate 38 and turn-off gate 42. Enabling of turn-on gate 38 is effective to set flip-flop 50 to the one state, thereby applying a voltage +E, by means of transistor switch 52, to the input of filter 54. Conversely, enabling of turn-off gate 38 is effective to reset flip-flop 50 to the zero state, thereby reapplying a voltage —E through transistor switch 52 to the input of filter 54. Further details of an exemplary output circuit useful in the data conversion system of the invention is to be found in the above-referenced copending application Ser. No. 260,218.

Referring again now to FIG. 2, it should now be understood that the interrogation counter, responsive to a source of clock pulses, is a prime timing source for generating the asymmetrical output waveforms, FIG. 2 illustrating this waveform for channel A corresponding to the digital number 1010. Initially, the resetting of counter 34 to 00 in response to clock pulse 1 is effective to reset fine data address counter 32 also to 00. Further, should free-running coarse address counter 30 be out-of-phase with counter 34, a reset pulse is provided along a line 23 (see FIG. 3) to set coarse address counter 30 to a count of three (11). In response to the clock pulse 2, conversion start line C is energized by the 1 stored in the interrogation counter, and the channel A number is applied to serial memory unit 12. Four microseconds later, at the beginning of clock pulse period 6, the fine data of the channel A number is loaded into start counter 16, and one half microsecond later, the coarse data associated therewith is applied to subtractor unit 20. Note that at this time, subtractor unit 20 is inhibited from decrementing the coarse data as a result of the count of 0 in counter 34, in order to prevent the generation of a borrow signal during the second quarter while the channel A fine data is being operated on, the coarse data merely being applied in unmodified form to the input of the serial memory unit through enter gates 11. Also, at this time the resetting of the interrogation counter increases the count in the fine address counter by "one," to commence the second quarter and thereby couple the output circuit for channel A to start counter 16.

During the next four clock pulse periods, 6 through 10, channel A will be turned on in accordance with the value of its fine data, the actual turn on time for the value 10 being indicated in the channel A waveform as the beginning of clock pulse period 8. Additionally, during the first of these clock pulse periods, clock pulse period 7, the coarse data address counter couples the channel A output circuit to borrow flip-flop 40. It is for this reason that a borrow signal is prevented from being generated when the coarse data emerges from the serial memory the first time during clock pulse period 6, and this insures that a channel will not be turned off prior to zero reference time. Note that the next possible turn off time for channel A, as determined by the coarse data address counter, does not occur until after time $T_r$. Further, during the second of these clock pulse periods, that is, clock pulse period 8, the interrogation count again stands at 1, and at this time the channel B data to be converted is entered into the serial memory. It thus can be seen from FIG. 2, that each channel is turned on consecutively, that is, first channel A, next channel B, then channel C and finally channel D, and this feature is obtained by merely shifting the zero time reference five microseconds from channel to channel.

The turn-off sequence should also now be obvious. Remembering now that the coarse data initially emerged from memory with the count in interrogation counter 34 at 00, this data was not decrementated, but only recirculated. However, the coarse data for channel A is next available from memory with the interrogation counter set to 4 (100) at the beginning of clock pulse period 10, and this time the data is decremented prior to recirculation. Should a borrow signal be generated by this subtraction, borrow flip-flop 40 will be set, and the coarse data address steers this signal to the channel A output circuit, thereby turning off channel A immediately after $T_r$. Continuing with the present example, with the coarse data having a value of 10, the first decrementing reduces the coarse data to 01, the second decrementing, during clock pulse period 14 reduces this value to 00, and the third decrementing during clock pulse period 18 converts the coarse data to 11, thus generating a borrow signal during this subtraction operation. This borrow signal, together with the output of the coarse data counter during clock pulse period 19, turns off the channel A waveform at the time shown in FIG. 2.

It should also be noted that the fourth decrementing returns the coarse data to its original value of 10. However, at this time, clock pulse period 22 or 2, interrogation counter again stands at 1, and as stated previously a count of 1 from counter 34 energizes line C coupled to enter-recirculate gates 11, and is effective as an enter signal allowing either new or recirculated data to be converted. New data from input register 10 replaces the recirculating data only when both lines C and E are energized. When the enter new data line E is not energized, old data automatically recirculates as it does when the C line is not energized, regardless of the condition of the E line. The enter new data line E is energized by the same device which places the new data in the input register, and is deenergized immediately after the occurrence of the energization of the C line. The following table summarizes the timing illustrated in FIG. 2.

TABLE

| Count In | | | |
|---|---|---|---|
| Interrogation Counter | Coarse Data Address Counter | Fine Data Address Counter | Operation |
| 4 | 1 | 3 | |
| 0 | 2–3 | 0 | Synchronize Coarse and Fine counters. |
| 1 | 0 | 0 | Enter data for channel A. |
| 2 | 1 | 0 | |
| 3 | 2 | 0 | |
| 4 | 3 | 0 | |
| 0 | 0 | 1 | Dump fine data channel A and recirculate coarse data channel A. |
| 1 | 1 | 1 | Enter data for channel B. Turn on channel A if LSB=11. |
| 2 | 2 | 1 | Turn on channel A if LSB=10. |
| 3 | 3 | 1 | Turn on channel A if LSB=01. |
| 4 | 0 | 1 | Decrement coarse data channel A, and Turn on channel A if LSB=00. |
| 0 | 1 | 2 | Dump fine data channel B, recirculate coarse data channel B, and turn off channel A if MSB=00. |
| 1 | 2 | 2 | Enter data for channel C and turn on channel B if LSB=11. |
| 2 | 3 | 2 | Turn on channel B if LSB=10. |
| 3 | 0 | 2 | Decrement coarse data channel A, and turn on channel B if LSB=01. |
| 4 | 1 | 2 | Decrement coarse data channel B, turn on channel B if LSB=00, and turn off channel A if MSB=01. |
| 0 | 2 | 3 | Dump fine data channel C, recirculate coarse data channel C, and turn off channel B if MSB=00. |
| 1 | 3 | 3 | Turn on channel C if LSB=11 and enter data for channel D. |
| 2 | 0 | 3 | Decrement coarse data channel A and turn on channel C if LSB=10. |
| 2 | 1 | 3 | Turn off channel A if MSB=10, turn on channel C if LSB=01 and decrement coarse data channel B. |
| 4 | 2 | 3 | Turn off channel B if MSB=01, turn on channel C if LSB=00, and decrement coarse data channel C. |
| 0 | 3 | 0 | Dump fine data channel D, recirculate coarse data channel D, and turn off channel C if MSB=00. |
| 1 | 0 | 0 | Decrement coarse data channel A, enter data for channel A, and turn on channel D if LSB=11. |
| 2 | 1 | 0 | Turn off channel A if MSB=11, decrement coarse data channel B, and turn on channel D if LSB=10. |
| 3 | 2 | 0 | Turn off channel B if MSB=10, decrement coarse data channel C and turn on channel D if LSB=01. |
| 4 | 3 | 0 | Turn off channel C if MSB=01, decrement coarse data channel D, and turn on channel D if LSB=01. |

It should now be understood that four words are loaded into the serial memory in sequence, one of the words, resulting from new data or corresponding to data previously converted into an analog voltage, being applied thereto at the proper time to commence a conversion operation, while the three remaining words are being recirculated in order to complete a conversion operation. Further, the particular number being converted is recirculated through the serial memory four times after it first emerges from memory, thereby defining the 20 microsecond conversion time. Additionally, in the absence of new or updated data, the digital data once applied to the system of the invention is indefinitely reconverted into an analog signal, while individual words may be updated or changed under control of new data enter line E. It should also be noted that the hereinbefore mentioned foldover problem is also eliminated by the present data conversion system, since the positive reference potential is applied to, and removed from, the output only once during each conversion operation. Therefore, independent of the number of carry signals generated due to an increase of one or more of the lessor significant bits, the *phase* of the asymmetrical analog waveform is not altered, but rather the time duration of the waveform is modified in accordance with the variation in the value of the digital number being converted.

Also it might be assumed that the system does not, in fact, provide an analog voltage commensurate with the magnitude of the digital number converted, since, as described above, each digital number causes the initiation of the analog waveform, and during the major portion of the time that the number is traveling through the serial memory the waveform can neither be turned on nor turned off. Thus, even if the value of the digital number is zero, the positive reference potential is applied to the filter input for approximately one and one half microseconds, and if the value of the digital number is one, the positive reference potential is removed from the filter input for at least two microseconds. However, by properly scaling the magnitude of the reference potentials employed, as indicated by the values $E_1$ and $E_2$ in FIGS. 1*a* and 1*b*, the desired accurate conversion it attained. This feature can perhaps best of understood by realizing that, by way of example, *five* distint digital values are necessary to define a range of 0 to 1 in equal increments, namely, 0, ¼, ½, ¾, and 1, while only *four* distinct digital values are available in the specific embodiments described above, that is, 00, 01, 10, and 10. In accordance with standard logic techniques, however, the four generated analog voltages are separated by ¼ increments defining the following ranges:

⅛ represents the range 0 to ¼
⅜ represents the range ¼ to ½
⅝ represents the range ½ to ¾
⅞ represents the range ¾ to 1

In this manner, the analog value commensurate with the digital number being converted is obtained, as will be understood by those skilled in the art.

While only an elementary four-bit, four-word digital to analog converter has been specifically described in detail herein for reasons of clarity, the extension to a more complex system should now be obvious. By way of example, a twelve-bit 64 word converter system requires merely the selection of six 64 microsecond delay serial memory devices for serial memory unit 12, increasing the count interrogation counter 34 to 65, and advancing the count in fine data address counter 32, under control of the interrogation counter, once each 65 microseconds.

A further embodiment of the invention contemplates a data conversion system that also generates a turn on and a turn off signal once each conversion operation, but eliminates the use of a serial memory unit. In the embodiment, the fine data is again applied to a fine data turn on counter as before, while the coarse data is only applied to a coarse data turn off counter, from which a count of one is subtracted during each clock pulse period after zero reference time, the generation of a borrow pulse being operable as a turn off signal. Although this embodiment does not afford the advantage of time sharing the various circuit components, it still does provide only a single asymmetrical waveform per channel as described above. What has been described is a simplified time-weighing digital to analog converter which requires that each analog output channel be turned on and turned off only once during the conversion of each digital word, resulting in a single asymmetrical waveform being applied to the input of a low pass filter for each digital word wherein the asymmetry of the waveform is a measure of the analog value corresponding to the value of the digital word. This conversion operation is essentially pulse width modulation wherein the pulse is initiated in accordance with the value of the lesser significant bits of the digital word, and the termination of the pulse is determined by the value of the most significant digits. Further, the independent turn-off and turn-on times are derived in such a manner that time-sharing of the necessary circuitry is possible, thereby reducing the circuit complexity. By way of example, only a single processing circuitry is required to determine all of the turn-on times and, additionally, only a single processing circuitry is necessary to determine all of the turn-off times, when a plurality of digital numbers are being converted. This advantageous feature merely requires that the various analog output signals be slightly shifted in time, one to another, while permitting a number of digital words to be simultaneously converted into corresponding analog signals.

It will thus be seen that the objects set forth above, among those made apparent from the preceding description, are efficiently attained, and since certain changes may be made in the above constructions without departing from the scope of the invention, it is intended that all matter contained or shown in the accompanying drawings shall be interpreted as illustrative and not in a limiting sense.

The embodiments of the invention in which an exclusive property or privilege is claimed are defined as follows.

I claim:

1. A data conversion system comprising,
a source of digital data, each of said data being encoded in groups of binary pulses, the pulses of each group each bearing a prescribed significance in accordance with its order within the group;
circuit means connected to said source for arranging each of said data in first and second subgroups at an output thereof, said first subgroup including the pulses of lesser significance and said second subgroup including the pulses of greater significance;
a bistable device providing a first output potential when in one of its stable states and a second output potential when in the other of its stable states; and
means coupling said first subgroup at an output of said circuit means to said bistable device and then said second subgroup at an output of said circuit means to said bistable device, said circuit means including first means responsive to said first subgroup for switching said bistable device only to the other of its stable states and second means responsive to said second subgroup for switching said bistable device one to said one of its stable states.

2. A data conversion system comprising,
an output terminal;
first and second voltage sources;
a source of multibit digital words wherein each of said words includes a number of binary bits arranged in a predetermined order of relative significance;
means connected to said source of digital words for measuring the value of the bits of lesser significance in combination and the value of the bits of greater significance in combination; and means responsive to said measuring means for coupling said first voltage source to said output terminal at a time determined only by the value of the bits of lesser significance and for coupling said second voltage source to said output terminal at a time determined only by the value of the bits of greater significance to thereby provide an analog signal commensurate with the value of said multibit digital word.

3. A data conversion system for converting multi-bit digital data words into corresponding analog voltage signals comprising, an output terminal;

at least one voltage source;

first means for measuring the binary value of both the bits of lesser significance and the bits of greater significance; and second means controlled by said first means for selectively coupling said at least one voltage source to said output terminal at a time determined only by the binary value of the bits of lesser significance and for removing said at least one voltage source from said output terminal at a time determined only by the binary value of the bits of greater significance.

4. A digital to analog conversion apparatus comprising, means for storing a plurality of multibit digital data words;

a plurality of output terminals, one for each of said words;

first and second voltage sources;

means for reading out consecutively from said storing means all of said plurality of words serially by bit to provide at an output thereof a sequence of bits of lesser significance and a sequence of bits of greater significance alternatively;

means connected to an output of said reading means for measuring the value of each sequence of bits;

means connected to said measuring means for connecting one of said first and second voltage sources to each of said plurality of output terminals at a time determined only by the value of the bits of lesser significance; and means connected to said measuring means for connecting the other of said first and second voltage sources to each of said plurality of output terminals at a time determined only by the value of the bits of greater significance.

5. Data conversion apparatus comprising, a source of multibit digital data words;

at least one output terminal;

first and second sources of precision reference potentials;

first means connected to said source of digital words for generating a first signal at a time determined by the value of the bits of lesser significance in combination of each of said multi-bit digital words;

second means connected to said source of digital words for generating a second signal at a time determined by the value of the bits of greater significance in combination of each of said multibit digital words; and means responsive only to said first signal for coupling said first source to said at least one output terminal and further responsive only to said second signal for coupling said second source to said at least one output terminal.

6. The apparatus of claim 5 additionally including means connected to said second means for inhibiting the generation of said second signal until said first signal has in fact been generated.

7. Data conversion apparatus comprising, a source of digital data, each of said data being encoded in groups of binary pulses, the pulses of each group each bearing a prescribed significance in accordance with its order within the group;

circuit means connected to said source of digital data for arranging each of said data in first and second subgroups, said first subgroup including the pulses of lesser significance and said second subgroup including the pulses of greater significance;

a bistable device providing a first output potential when in one of its stable states and a second output potential when in the other of its stable states;

a source of clock pulse defining a sequence of clock pulse time intervals;

first means applying said first subgroup of digital data and said clock pulses to a start counter device, said start counter device being connected to said bistable device and operable to provide a set signal for said bistable device upon the occurrence of a predetermined count in said counter; and second means applying said second subgroup of digital data and said clock pulses to a subtractor unit, said subtractor unit being connected to said bistable and operable to provide a reset signal for said bistable device upon the occurrence of the generation of a borrow signal.

8. The apparatus of claim 7 including means connected to said second means for inhibiting the generation of a reset signal prior to the generation of a set signal.

9. The apparatus of claim 7 including a serial memory unit for storing said second subgroup for time intervals determined by the significance assigned to the least significant bit of the pulses of greater significance.

10. The apparatus of claim 9 further including means coupling the output of said subtractor unit to the input of said serial memory unit and the output of said serial memory unit to the input of said subtractor unit.

11. A digital to analog conversion apparatus comprising, means for storing a plurality of multi-bit digital data words;

a plurality of output terminals, one for each of said words;

first and second voltage sources;

means connected to said storing means for reading out consecutively from said storing means all of said plurality of words to provide a sequence of bits of lesser significance and a sequence of bits of greater significance alternatively;

means connected to said reading means for measuring the value of each sequence of bits;

means connected to said measuring means for connecting one of said first and second voltage sources to each of said plurality of output terminals at a time determined by the value of the bits of lesser significance; and means connected to said measuring means for connecting the other of said first and second voltage sources to each of said plurality of output terminals at a time determined by the value of the bits of greater significance.

12. The apparatus of claim 11 further including, a source of clock pulses connected to each of said connecting means and defining unit time intervals; said time at which said one of said first and second voltage sources is connected to said plurality of output terminals being characterized by said unit time intervals and said time at which said other of said first and second voltage sources is connected to said plurality of output terminals being characterized by a plurality of said unit time intervals; and wherein said storing means is connected to said source of clock pulses and includes a serial memory unit for storing said sequence of bits of greater significance for a time duration defined by said plurality of unit time intervals.

13. The apparatus of claim 12 wherein said plurality of unit time intervals is determined by the value accorded the least significant one of the bits of greater significance.

14. The apparatus of claim 12 wherein said serial memory unit comprises a member of parallel delay lines, said number being equal to the number of bits of lesser significance or greater significance, whichever is the larger as the case may be.

15. The apparatus of claim 14 wherein said number of bits of lesser significance is equal to the number of bits of greater significance.

16. The apparatus of claim 12 wherein said serial memory unit comprises a number of shift registers responsive to said source of clock pulses, said number being equal to the number of bits of lesser significance or greater significance, whichever is the larger as the case may be.

17. A data conversion system comprising, a source of digital numbers;

an input register, a serial memory unit;

means coupling said source to said input register;

a data enter-recirculate gate unit connected to said register and selectively operable to couple digital numbers stored in said register to said serial memory unit during predetermined time intervals to initiate a digital to analog conversion operation and operable during other time intervals to recirculate digital numbers previously applied to said serial memory unit;

a start counter;

a subtractor unit;

a source of clock pulses;

a plurality of output circuits, one for each of said numbers;

means connected to an output of said serial memory unit and said source of clock pulses for coupling the least significant bits of each of said numbers consecutively in combination with pulses from said source of clock pulses to said start counter to generate a turn-on signal in accordance with the value of said least significant bits;

means connected to an output of said serial memory unit and said source of clock pulses for coupling the most significant bits of each of said numbers consecutively in combination with pulses from said source of clock pulses to said subtractor unit to generate a turn-off signal in accordance with the value of said most significant bits; and steering circuit means connected to each of said output circuits for applying said turn-on signal and then said turn-off signal to the individual one of said plurality of output circuits associated with said number to provide an asymmetrical waveform commensurate with the digital value of said number, said output circuits each including filter means for smoothing said asymmetrical waveform to provide an analog output signal.

18. The system of claim 17 wherein said turn-on signals are generated for each of said digital numbers one after the other and said turn-off signals may be successively generated in accordance with the value of said most significant bits during each of a number of time intervals defined by said clock pulses.

19. The system of claim 17 wherein each of said digital numbers include a LSB, a $LSB+1$, a $MSB-1$, and a MSB, and said serial memory unit comprises a pair of delay lines operative in parallel.

20. The system of claim 17 including means for inhibiting said subtractor unit from generating a turn-off signal for each of said numbers during the time intervals when the associated turn-on signal is being generated.

References Cited

UNITED STATES PATENTS

| | | | |
|---|---|---|---|
| 2,888,647 | 5/1959 | Beter et al. | 340—347 |
| 2,907,021 | 9/1959 | Woods | 340—347 |
| 2,954,165 | 9/1960 | Myers | 340—347 |
| 3,012,240 | 12/1961 | Klahn | 340—347 |
| 3,177,472 | 6/1965 | Githens | 340—347 |
| 3,267,429 | 8/1966 | Strohmeyer | 340—347 |
| 3,292,173 | 12/1966 | Horton et al. | 340—347 |
| 3,313,922 | 4/1967 | Magnin. | |

MAYNARD R. WILBUR, Primary Examiner

W. J. KOPACZ, Assistant Examiner